Aug. 2, 1960

J. W. BLACK 2,947,021

SWIVEL CASTER STRUCTURE

Filed Jan. 18, 1957

INVENTOR.
JOHN W. BLACK
BY
Woodhams, Blanchard and Flynn
ATTORNEYS

Aug. 2, 1960

J. W. BLACK 2,947,021

SWIVEL CASTER STRUCTURE

Filed Jan. 18, 1957

INVENTOR.
JOHN W. BLACK

BY
Woodhams, Blanchard & Flynn
ATTORNEYS

United States Patent Office 2,947,021
Patented Aug. 2, 1960

2,947,021

SWIVEL CASTER STRUCTURE

John W. Black, Kalamazoo Township, Kalamazoo County, Mich., assignor to Pemco Wheel Company, Kalamazoo, Mich., a corporation of Michigan Filed Jan. 18, 1957, Ser. No. 635,001

5 Claims. (Cl. 16—21)

This invention relates to a swivel caster structure and to a method of assembling same and, more particularly, refers to the structure and method of assembly for a swivel caster adapted for supporting a plate or surface for rotation, and in axially non-movable relationship, with respect to a caster pin or shaft perpendicular to said plate, and wherein a load is applied between said pin or shaft and said plate in a direction perpendicular to said plate.

In the designing of swivel casters it is necessary to support a plate for rotation about a pin or shaft which usually extends substantially perpendicular to said plate and for carrying a load on said pin or shaft in a direction perpendicular to said plate, without permitting movement of said plate axially with respect to said pin or shaft. A large number of structures have been devised and utilized for minimizing the friction between a pin or shaft and such a plate, and some of those which have thus far been developed are reasonably satisfactory. However, in a constant effort to improve such constructions, and at the same time to lower the cost thereof, it has been necessary to meet and solve a number of problems which have previously been unsolved.

Foremost among such problems has been the matter of protecting the moving parts of the bearing portion of the caster structures from contact with dirt or other abrasive particles without prohibitively increasing the cost of the structures. Since many of these devices are used for supporting swivel casters on the under side of small hand trucks and other similar devices in factories or warehouses, it is apparent that the structures are utilized in zones where dirt and grit are prevalent. However, many conventional bearing constructions for swivel casters, because of cost considerations, permit such dirt and grit to enter into the bearing structures, even though this greatly increases the rate of wear thereof. Others of these casters are used in places where cleanliness is an important consideration, such as for office furniture, retail store display racks or for surgical carts, and this renders it important that lubricant in the swivel bearing be reliably prevented from escaping. Thus, it is highly desirable to provide a tight seal for the swivel bearing of a swivel caster, such seal being important both to prevent the entry of dirt and grit into the bearing and to prevent the escape of lubricant out of the bearing. Previous attempts to provide such a tight seal for swivel bearings have been either ineffective or they have been unduly costly and have, therefore, not come into general use. The present invention provides a construction by which the running parts of the swivel caster bearing are well shielded from the entry of dust, dirt, grit and other wear-increasing materials and by which the lubricant is reliably retained within the bearing, and it does so without materially increasing the cost of the resulting bearing structure as compared with the presently used commercial structures.

A further problem, which has arisen in connection with the improvement of swivel caster bearing structures, involves the presently common use of a portion of the frame structure, on which the caster wheel is carried, as a race for the bearing balls. This has the advantage of attaining the maximum of simplicity in construction, but in order to secure a race for the bearing balls which is sufficiently wear-resistant, it has been necessary to harden, as by heat-treating, the entire frame structure to provide a wear-resistant surface on the race. Heat-treating of the entire frame structure is a relatively expensive operation and has added materially to the cost of this caster construction. However, much of this heat treatment is functionally unnecessary because only the portions of the frame which contact the bearing balls need have wear-resistant surfaces.

The present invention provides a highly simplified, but effective, swivel caster bearing construction, and a method of assembly for same, which successfully, and in a single, simple and unified construction, solves both of the above mentioned problems, as well as others recognizable by persons acquainted with the art.

Accordingly, a principal object of the invention is to provide an improved swivel caster bearing structure for permitting relative rotation between a plate and a shaft extending substantially perpendicular to the plate.

A further object of the invention is to provide a structure, as aforesaid, for pivoting a swivel caster, having an inverted U-shaped frame member, to the under side of a supporting device or to a shaft or a pivot pin.

A further object of the invention is to provide a structure, as aforesaid, in which the bearing structure is tightly shielded against the entry of dirt, grit or other wear including materials into its running parts.

A further object of the invention is to provide a structure, as aforesaid, which will effect the desired dirt-shielding results, without appreciably adding to the cost of the bearing structure.

A further object of the invention is to provide a swivel caster structure, as aforesaid, in which a portion of the sealing function is obtained by an element having no other functional purpose, so that, where the intended use of the swivel caster structure will subject it to only limited exposure to dirt or grit, it will be possible to omit said element from the bearing portion thereof and thereby further decrease its cost, without losing more than a part of the dirt-shielding characteristics otherwise available, without otherwise changing the caster structure, and without losing other advantages of the present invention.

A further object of the invention is to provide a swivel caster structure, as aforesaid, having ball bearings in which only the parts of the structure which actually contact the bearing balls need to be provided with wear-resistant surfaces.

A further object of the invention is to provide a method of assembling a swivel caster structure, in which the wear-resistant parts of the structure may be heat-hardened, without hardening other associated parts of the structure, and in which said hardened parts and non-hardened parts may be assembled in operative position with respect to each other, without appreciably, if at all, affecting the hardness of the hardened parts.

A further object of the invention is to provide a structure, as aforesaid, which is extremely simple and can, accordingly, be both assembled and maintained at a minimum of cost.

A further object of the invention is to provide a caster structure, as aforesaid, having upper and lower, substantially spaced, portions by which a stronger and more sturdy structure is obtained.

A further object of the invention is to provide a swivel caster structure, as aforesaid, in which the top and bottom bearing assemblies are formed of identical parts and have identical numbers and size of bearing balls.

A further object of the invention is to provide a structure, as aforesaid, which can be made extremely sturdy without materially adding to the cost thereof, and which is capable of long and satisfactory use.

Other objects and purposes of the invention will be apparent to persons acquainted with structures and methods of this general type upon reading the following specification and inspecting the accompanying drawings.

*General description*

In general, the method aspects of the invention contemplate the assembly of a swivel caster by steps including the projection welding of bearing races having hardened surfaces onto a frame structure of any suitable material, which will usually be a ferrous material and which may or may not be heat-hardened.

The structural aspects of the invention contemplate a swivel caster construction wherein the wheel supporting frame is swivelly connected to a fixed mounting pin, or post, through a bearing structure having a first portion above a horizontal plate comprising a part of the frame and a second portion below said plate. Both of said portions are identical with respect to each other and are similarly, with respect to each other, mounted on the frame and on the pin or post. Each said portion of the bearing structure consists of a race and a cone member. The races are projection welded respectively to the upper and lower surfaces of said horizontal frame plate in a somewhat back-to-back relationship. The cones are each arranged on the respective open sides of said races, retain bearing balls, respectively, between themselves and the races, are fastened to the post or pin to which it is desired to connect the wheels supporting frame and are provided with flanges telescoping the races and approaching into close proximity with said horizontal frame plate. If desired, and preferably for maximum dirt excluding results, a resilient washer may be secured to the peripheral edge of each cone flange and will extend radially inwardly to bear against the respective cones, preferably at the point where said cones respectively join the horizontal frame plate. However, these washers can be omitted where desired in the interest of economy and the overlapping relationship of the cone flanges with respect to the races, and the close approach of the cone flanges to the horizontal frame plate will, even without the resilient washers, effectively exclude a large portion of the dirt from entry into the zone occupied by the bearing balls.

Figure 1:
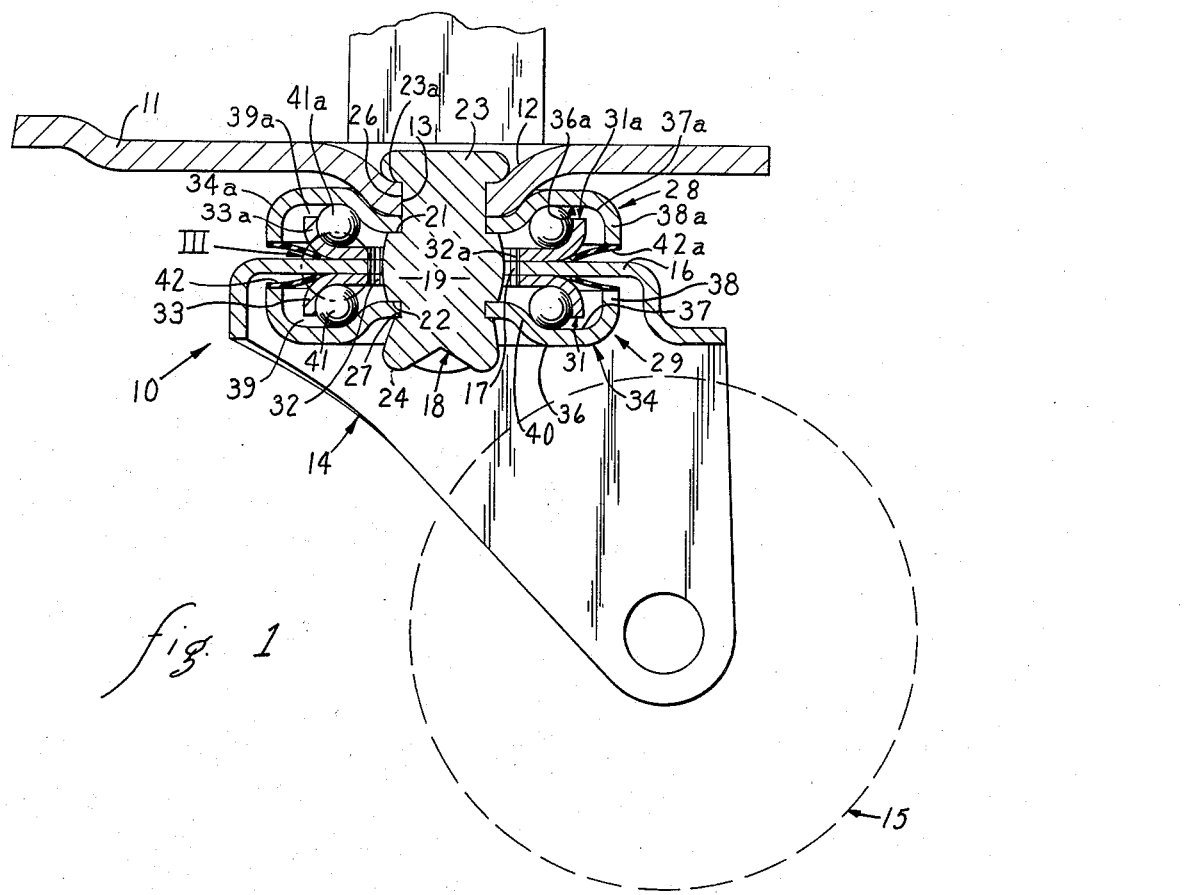
Figure 1 is a central, sectional view of the bearing structure associated with a caster.
Figure 2:
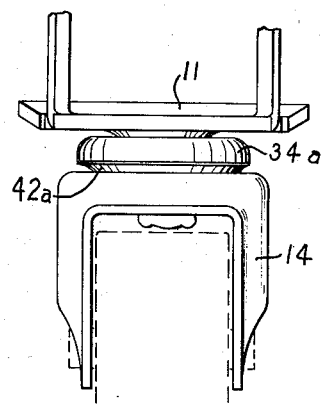
Figure 2 is a front view of the caster structure.

For the purpose of convenience in description, the terms "upper," "lower," and derivatives thereof, will have reference to the bearing structure and parts thereof in normal operating position, as appearing in Figure 1. The terms "front," "rear," and derivatives thereof, will have reference to directions toward and away from that end of the bearing structure from which the structure is normally viewed, which is the leftward end as appearing in Figures 1 and 2. The terms "left," "right," and derivatives thereof, will have reference to the structure as appearing to a person viewing the structure from the front end thereof.

Similarly, the terms "vertical," "horizontal," derivatives thereof, and other words imparting position, will be freely used for convenience in reference and will be understood to refer to the structure as shown and in its position of normal use. However, the use of such terminology shall not imply that the structure cannot be used in other positions, nor shall it imply that the principles of the invention, as hereinafter defined, cannot be employed in modified structures having other and different positions of normal use.

*Detailed construction*

Referring to Figure 1, there is shown a swivel caster structure 10, which includes a plate 11 connectible to any suitable structure (not shown), such as a hand truck, which is supportable by casters. The plate 11 has a depressed portion 12, having a central opening 13 therethrough.

A frame 14, of substantially inverted U-shape, includes a second plate 16, which is to be held pivotally with respect to the plate 11. The second plate 16 has a central opening 17 therethrough. A wheel 15 may be supported between the legs of the U-shaped frame 14 in conventional fashion.

A pivot pin 18 is connected to the plate 11 and extends through the central opening 17 in the plate 16. The pivot pin has an enlarged central portion 19, formed during the assembly operation as hereinafter described, and defining a pair of longitudinally spaced shoulders 21 and 22. The pivot pin has an enlarged head 23, which defines a shoulder 23a. During the assembly operation, as hereinafter described, an enlarged head 24 is formed at the lower end of the pivot pin 18 and serves to fix the pivot pin 18 firmly with respect to the plate 16. The enlarged heads 23 and 24 also define, in cooperation with the shoulders 21 and 22, a pair of grooves 26 and 27 in the periphery of the pivot pin 18.

A pair of bearing structures 28 and 29 are disposed around the pivot pin 18 on either side of the second plate 16 and provide an anti-friction support for said plate. The bearing structure 28 is disposed between the adjacent surfaces of the plates 11 and 16, and the bearing structure 29 is disposed adjacent the lower surface of the plate 16.

The bearing structures 28 and 29 are identical and, therefore, a detailed description of only the bearing structure 29 will be given herein. Corresponding parts of the other bearing structure 28 are indicated by the same reference numerals with the suffix "a" applied thereto.

The bearing structure 29 includes an annular retainer cup or race 31, said cup having a central opening 32 and a race flange 33 extending away from said plate 16. The cup 31 is fixed to the lower surface of the plate 16 in a manner hereinafter described.

An annular retaining cone 34 is mounted in the groove 27 in the pivot pin 18. The cone has an upwardly facing, annular groove 39 positioned directly below the race flange 33. The wall 36, defining said groove 39, extends convexly downwardly at 40 and then merges into a substantially planar, horizontal surface 37. Said surface 37 extends radially outwardly and then concavely merges with an upstanding peripheral wall or flange 38, which extends upwardly toward the lower surface of the plate 16. The wall 36, the surface 37 and the flange 38 thus define the annular groove 39 on the retaining cone 34. The race flange 33 of the retainer cup 31 extends into said annular groove 39 and is, accordingly, in a somewhat telescoping relationship with the flange 38. The first race, defined by the flange 33, and the second race, defined by the wall 36, are opposed and provide a support for the bearing balls 41, as hereinafter described.

The cup 31 is, desirably, provided with a hard, wear-resistant surface, particularly at the regions thereof which are to engage the bearing balls 41, by any convenient, conventional, metallurgical technique, such as heat-treating, case hardening, or the like.

A set of bearing balls 41 is positioned within the retainer cup 31 in the space defined by, and between, the race flange 33 and the wall 36.

An annular shielding strip 42, which may be of any suitable resilient material, such as neoprene, is preferably secured to the upper edge of the wall 38 and extends substantially to the juncture of the plate 16 and the retainer cup 31. The strip 42 is not necessarily secured to either the plate 16 or the cup 31, but is substantially in sliding contact with at least one thereof to permit relative rotation between the retaining cone 34 and the plate 16.

Projections 43 are provided on the retainer cup 31 (Figure 3) to extend toward and contact the plate 16, which projections substantially disappear during the assembly operation.

Assembly

Figure 3:
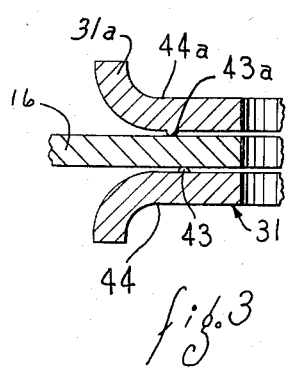
Figure 3 is an enlarged view of the structure shown within the circle III of Figure 1, during the assembly of the races to the frame.

The retainer cups or races 31 and 31a are placed in the desired position on the opposite surfaces of the plate 16, with the projections 43 and 43a in contact with the respective surfaces of said plate, as shown in Figure 3, said projections 43 being horizontally, or circumferentially, offset with respect to said projections 43a.

Electric current is passed through this assembly, while pressure is exerted thereon, to effect a weld of the cups 31 and 31a to the plate 16, primarily at the regions of the projections 43 and 43a, in accordance with conventional, projection welding techniques. The structure permits such welding of the cups 31 and 31a to the plate 16 to be carried out simultaneously and it is evident that economy of assembly time and effort will be furthered by so doing.

This offsetting, or staggering, of the projections 43 with respect to the projections 43a is done to minimize the concentration of heat in the plate 16 and thereby enable the assembly operation to be carried out with better control over the weld heat. Further, this staggering tends to minimize any roughness in the bearing which may result from roughness appearing in the ball supporting surfaces of the races 31 and 31a as a result of the welding operation.

The welding operation does not materially affect the hardness of the cups 31 and 31a at the regions thereof which are to engage the balls 41 and 41a, namely, the surfaces 44 and 44a, respectively, due to the low current density therein. However, during the welding operation, the projections 43 and 43a are fused to the adjacent surfaces of the plate 16 by the high density current applied thereto in a known manner, and the surfaces of the cups 31 and 31a adjacent the plate 16 are held in close contact therewith.

The manner and order in, and by which, the parts are assembled may vary from one instance to another, and the following is a typical, although not the only, manner and order of assembly and is presented for illustrative purposes only.

The plate 11 and the retaining cone 34a (Figure 1) are placed around the pivot pin 18 in engagement with shoulder 23a, said retaining cone having a shield strip 42a secured thereto. The pin 18 is then upset to form the enlarged, central portion 19, which locks the plate 11 and retaining cone 34a to the pin 18 in the groove 26. The bearing balls 41a are placed in proper position in the retaining cone 34a.

The assembly consisting of the plate 16 and the cups 31 and 31a is next positioned about the pivot pin 18, with the cups 31a engaging the balls 41a and locating same in proper position. The bearing balls 41 are then placed in the retainer cup 31. The retaining cone 34, having an annular shield strip 42 secured thereto, is positioned against the shoulder 22 and, while so held, the end of the pivot pin 18 is upset to provide the enlarged head 24 and the groove 27 for retaining the cone 34 in place.

It will be apparent that only the retainer cups 31 and 31a and the retaining cones 34 and 34a need be subjected to any hardening treatment for providing wear-resistant surfaces thereon. These wear-resistant surfaces are not subsequently injured by the assembly operation and, therefore, there will be no need to subject the rest of the device to any further hardening treatment.

It will also be apparent that the shield strips 42 and 42a provide an effective barrier to the entry of dust, dirt, grit or other wear-including materials into the bearing structures.

A further advantage of the present construction is found in the rather substantial distance which the upper and lower sets of bearing balls are spaced from each other in a direction axially of the pivot pin 18. This structure secures considerably less angular movement between the plate 15 and the axis of the pivot pin 18 than is currently obtainable with present commercially conventional caster structures while maintaining the same tolerances between corresponding bearing parts.

Modifications

Figure 4:
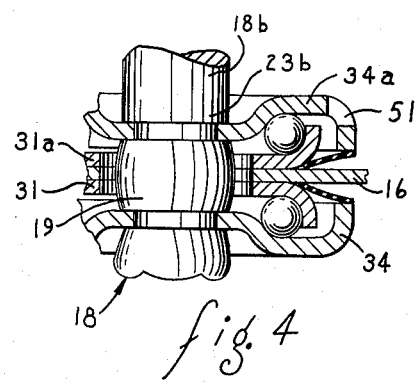
Figure 4 illustrates a modification of the structure.

While the foregoing described embodiment of the invention has been selected for the purpose of illustrating the invention, it will be apparent that numerous modifications in the details thereof may be made for meeting particular requirements, without departing from the substance of the invention. For example, in the above described embodiment the device is shown in association with the plate 11, and such is one common use of the device of the invention. However, as illustrated in Figure 4, the invention may also be used where the plate 16 is to be pivotally affixed to a shaft by causing the cone 34a to abut directly against the shoulder 23b of the shaft 18b, with the pivot pin 18 constituting a coaxial extension from said shaft. Similarly, said pin 18 may be secured to other suitable supporting structure in a variety of conventional ways.

Figure 4 also illustrates the use of optionally provided openings, as the opening 51, which may be used where desired to introduce lubricant into the bearing structure without the necessity of removing the swivel caster from its normal position of use. As many of such holes, as four, may be provided around the periphery, usually equally spaced, of the cones as are required to introduce lubricant uniformly into the zone occupied by the bearing balls.

Further, while it has been stated that the ends of the pivot pin 18 are upset and such is an advantageous way of effecting the construction of the invention, it will be apparent that at least some of the advantages of the invention can be obtained by securing the pivot pin to a supporting structure, such as the plate 11 or the shaft 18b, by other known means, such as, for example, by threading said pin and applying suitable threaded fasteners.

While the use of the shield strips 42 and 42a are effective for securing an extremely tight and effective seal and are consequently highly desirable, it will be recognized that, even with the shield strip 42 omitted the telescoping relationship of the flanges 33 and 38 of the respective bearing assemblies will provide a reasonably effective shielding of the zone containing the bearing balls and races from the entry of dirt or grit. Thus, where the anticipated use of the bearing is such that only partial dirt shielding is needed and it is desired to diminish still further the cost of the bearing, either or both of said shield strips 42 and 42a can be omitted and the device will still provide a reasonably effective shielding of the bearing from dirt and grit.

Figure 6:
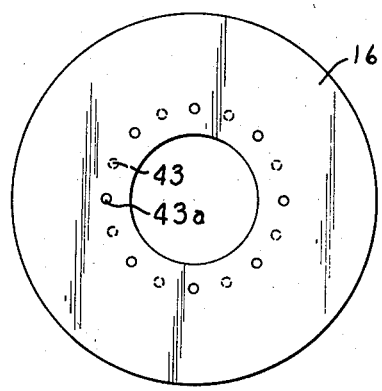
Figure 6 is a sectional view substantially as taken along the line VI—VI of Figure 5.
Figure 5:
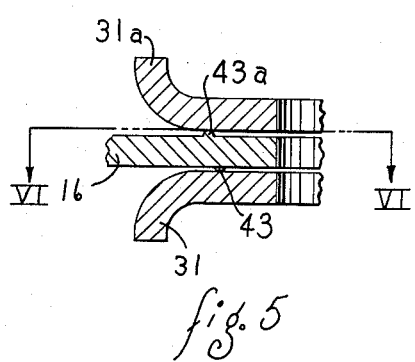
Figure 5 illustrates a modification of the race and frame structure, prior to assembly thereof.

As shown in Figure 3, the projections 43 and 43a extend from those surfaces of the retainer cups 31 and 31a, respectively, which face the plate 16. In assembly, it is desirable, as above stated, to stagger the positions of said projections with respect to each other to prevent undesirable concentrations of heat during the welding operation and to minimize roughness in the finished device. However, this necessitates a specific step in the assembly operation directed to this purpose. In order to eliminate this step and the labor cost incident thereto, the projections 43 and 43a may, if desired, be formed upon opposite sides of the plate 16 (Figures 5 and 6) in circumferentially offset relationship to each other as shown, thereby effecting the desired staggered positioning without further attention during the welding operation.

Although particular, preferred embodiments of the invention have been disclosed hereinabove for illustrative purposes, it will be understood that variations or modifications thereof, which do not depart from the scope of such disclosure, are fully contemplated unless expressly stated to the contrary in the hereinafter appended claims.

I claim:

1. In a swivel caster structure, the combination comprising: a top plate having a hole therethrough; a pivot pin extending through said hole and means rigidly securing said pin to said top plate; a frame having a wheel mounted thereon, said frame including a substantially planar plate having an opening therethrough, said pin extending loosely through said opening and said plate being positioned between the ends of said pin; a pair of substantially identical bearing units positioned, respectively, above and below said planar plate; said bearing units each consisting of an annular race, an annular retaining cone and a set of bearing balls therebetween; said races being of identical size and substantially identical configuration and being rigidly secured, respectively, to the upper and lower surfaces of said planar plate, said races each including an annular flange at its periphery extending away from such surface; said retaining cones also being of identical size and substantially identical configuration, each cone having an annular groove facing the race associated therewith and into which said annular flanges extend, each cone also having an annular, radially outer portion extending substantially beyond and spaced from the annular flange on the race associated therewith; said retaining cones being rigidly secured to said pin, respectively, above and below said planar plate; the respective sets of bearing balls being positioned within the respective races against and between the annular flange thereof and the opposing surface of the annular groove of the cone associated therewith.

2. In a swivel caster structure, the combination comprising: a top plate having a depressed central portion with a hole therethrough; a pivot pin extending through said hole and having an enlarged head bearing against the upper surface of said central portion; said pin having a first relatively thick peripheral groove immediately below said enlarged head and having a second relatively thin peripheral groove adjacent the lower end thereof, an enlarged central portion being provided between said grooves, said central portion of said plate being positioned against the upper edge of said first groove; a substantially U-shaped frame having a wheel mounted thereon, said frame including a planar plate having an opening therethrough, said planar plate being positioned with its opening surrounding the central portion of said pivot pin; a pair of identical bearing units positioned, respectively, above and below said planar plate, said bearing units each including an annular race fixed to said planar plate, said race having an annular flange extending away from said planar plate, each of said bearing units including an annular retaining cone surrounding and secured to said pin, said cone having an annular groove facing the race associated therewith and having an annular flange located radially outwardly of, and surrounding, the annular flange on the race associated therewith; each bearing unit also including a set of bearing balls positioned within the race between the annular flange thereof and the opposing surface of the annular groove of the cone; the central portion of the retaining cone of the upper bearing unit being fixedly received in said first groove between the lower surface of said depressed portion and the lower edge of said first groove and the central portion of the retaining cone of the lower bearing unit being fixedly received in said second groove.

3. The structure of claim 2 wherein the bearing units each include an annular, resilient shield ring extending inwardly from the edge of the annular flange of the cone substantially to the juncture of said planar plate and the race; said annular retaining cone having openings therethrough communicating with the annular groove therein, whereby lubricant may be placed within said groove.

4. In a swivel caster construction, the combination comprising: a top plate having a hole therethrough; a pivot pin extending through said hole and means rigidly securing said pin to said top plate, said pin having spaced upper and lower, annular recesses on the same side of said plate; a frame having a wheel mounted thereon, said frame including a swivel plate having an opening therethrough, said pin extending loosely through said opening and said swivel plate being positioned between and substantially parallel with the planes defined by said annular recesses; a pair of substantially identical bearing units positioned, respectively, above and below said swivel plate, each bearing unit consisting of an annular race, an annular retaining cone and a set of bearing balls therebetween; said races being of identical size and substantially identical configuration and being rigidly secured, respectively, to the upper and lower surfaces of said swivel plate, each race having an annular flange at its periphery extending away from such surface; said retaining cones being of identical size and substantially identical configuration, each cone having an annular groove facing said swivel plate and into which one of said annular flanges extends, each cone having an annular, radially outer portion extending substantially beyond and spaced from the annular flange on the race associated therewith; said retaining cones being rigidly secured respectively within said annular recesses; the respective sets of bearing balls being positioned against and between the annular flanges of said races and the opposing surfaces of the annular grooves of the cones associated therewith.

5. A swivel caster according to claim 4 wherein at least one of said bearing units includes an annular, resilient shield ring extending inwardly from the edge of the annular flange of the cone thereof substantially to the juncture of said planar plate and said race.

References Cited in the file of this patent

UNITED STATES PATENTS

| | | |
|---|---|---|
| 1,392,914 | Chesnutt | Oct. 11, 1921 |
| 1,424,028 | Noelting | July 25, 1922 |
| 1,636,326 | Roe | July 19, 1927 |
| 1,734,363 | Chesnutt | Nov. 5, 1929 |
| 1,884,142 | Noelting | Oct. 25, 1932 |
| 1,885,990 | Chesnutt | Nov. 1, 1932 |
| 1,896,698 | Chase | Feb. 7, 1933 |
| 2,111,561 | Herold | Mar. 22, 1938 |
| 2,787,804 | Noelting et al. | Apr. 9, 1957 |
| 2,823,967 | Harrington | Feb. 18, 1958 |